United States Patent [19]

Shirota

[11] Patent Number: 5,006,931
[45] Date of Patent: Apr. 9, 1991

[54] HIGHLY EFFICIENT CODING APPARATUS

[75] Inventor: Norihisa Shirota, Kanagawa, Japan

[73] Assignee: Sony Corporation, Tokyo, Japan

[21] Appl. No.: 482,252

[22] Filed: Feb. 20, 1990

[30] Foreign Application Priority Data

Feb. 28, 1989 [JP] Japan................... 1-PO46971

[51] Int. Cl.$^5$ ......................................... H04N 7/133
[52] U.S. Cl. ................................... 358/133; 364/725
[58] Field of Search ................. 358/133, 135; 364/725

[56] References Cited

U.S. PATENT DOCUMENTS

| | | | |
|---|---|---|---|
| 4,831,440 | 5/1989 | Borgers | 358/133 |
| 4,833,535 | 5/1989 | Ozeki | 358/133 |
| 4,931,869 | 6/1990 | Amor | 358/133 |
| 4,941,043 | 7/1990 | Jass | 358/133 |
| 4,953,018 | 8/1990 | Martens | 358/133 |

Primary Examiner—Howard W. Britton
Attorney, Agent, or Firm—Alvin Sinderbrand; William S. Frommer

[57] ABSTRACT

A highly efficient coding apparatus for encoding digital video data in a block format and compressing the video data if required into a number of bits so that the total number of bits in the digital video data to be transmitted is less than that of a predetermined transmission capacity. Coefficient data having a DC component and a plurality of AC components for each block are generated by an orthogonal transformation. A distribution table of the AC coefficient data is generated during a predetermined period, and an accumulating distribution table is generated from the distribution table. The total bit number of the AC coefficient data generated during the predetermined period is controlled in response to the accumulating distribution table and the predetermined transmission capacity of the data transmission channel. The DC coefficient data, the controlled AC coefficient data and an additional code are transmitting for each of the predetermined periods.

4 Claims, 15 Drawing Sheets

8 LINES

8 PIXELS

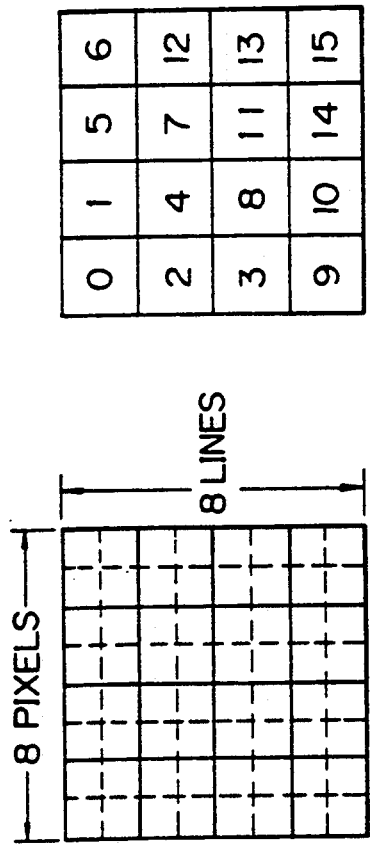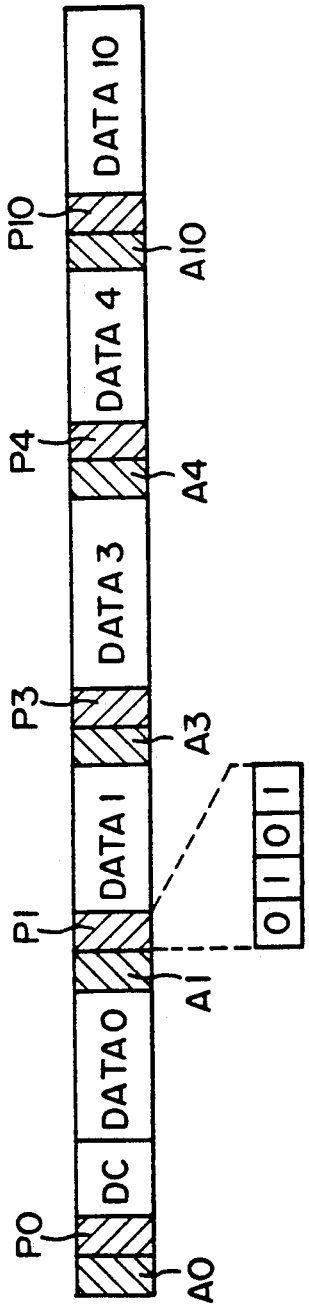

Fig.7A

| VALUE OF AC COMPONENT | NUMBER OF BITS | COEFFICIENT DATA |
|---|---|---|
| ± 1 | 1 | ± $a_0$ |
| ± 2,3 | 2 | ± $a_1 a_0$ |
| ± 4 ~ ± 7 | 3 | ± $a_2 a_1 a_0$ |
| ± 8 ~ ± 15 | 4 | ± $a_3 a_2 a_1 a_0$ |
| ± 16 ~ ± 31 | 5 | ± $a_4 a_3 a_2 a_1 a_0$ |
| ± 32 ~ ± 63 | 6 | ± $a_5 a_4 a_3 a_2 a_1 a_0$ |
| ± 64 ~ ±127 | 7 | ± $a_6 a_5 a_4 a_3 a_2 a_1 a_0$ |

Fig.7B

| TRANSMISSION DATA | NUMBER OF BITS |
|---|---|
| "1" S | 2 |
| "0" S "1" $a_0$ | 4 |
| "0" S "0" $a_1$ "1" $a_0$ | 6 |
| "0" S "0" $a_2$ "0" $a_1$ "1" $a_0$ | 8 |
| "0" S "0" $a_3$ "0" $a_2$ "0" $a_1$ "1" $a_0$ | 10 |
| "0" S "0" $a_4$ "0" $a_3$ "0" $a_2$ "0" $a_1$ "1" $a_0$ | 12 |
| "0" S "0" $a_5$ "0" $a_4$ "0" $a_3$ "0" $a_2$ "0" $a_1$ "1" $a_0$ | 14 |

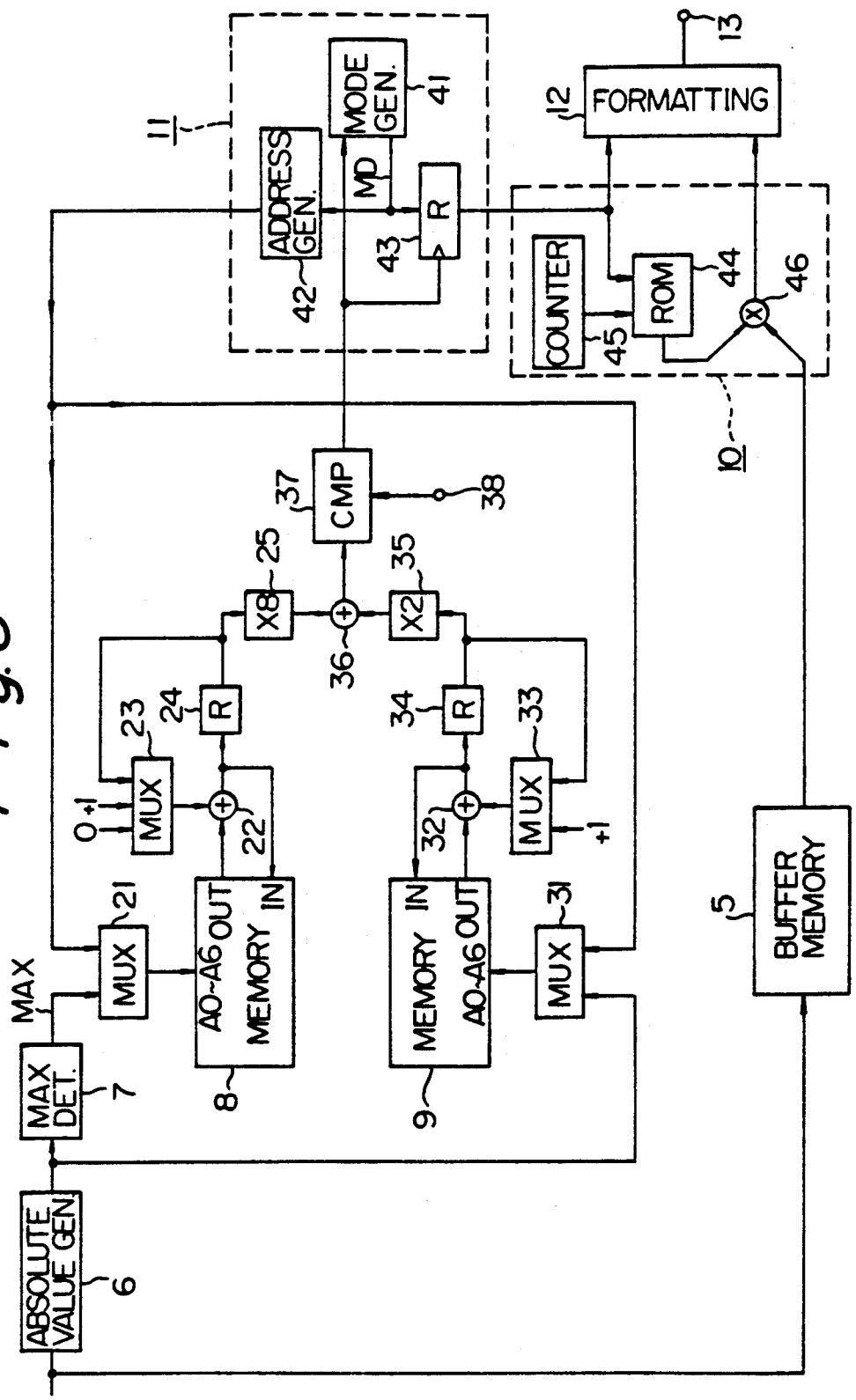

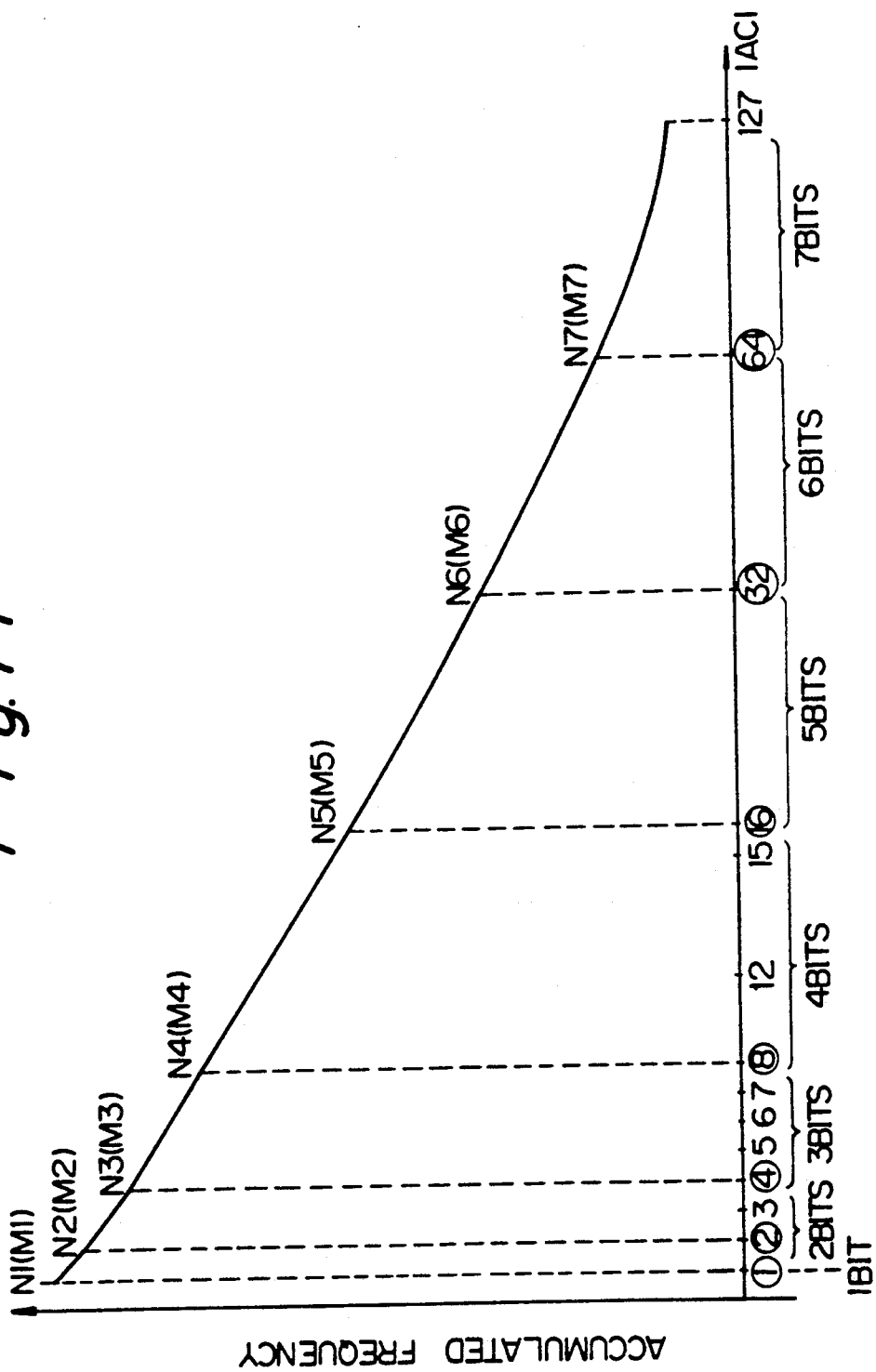

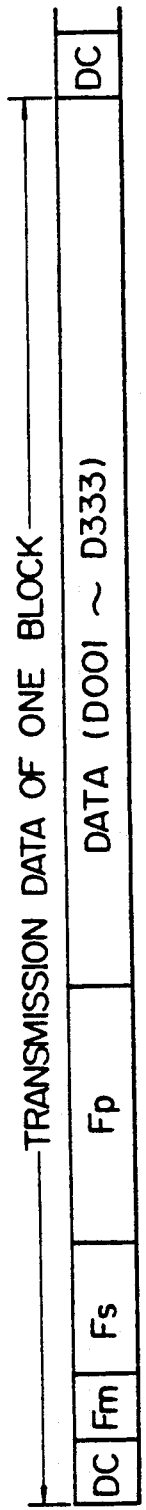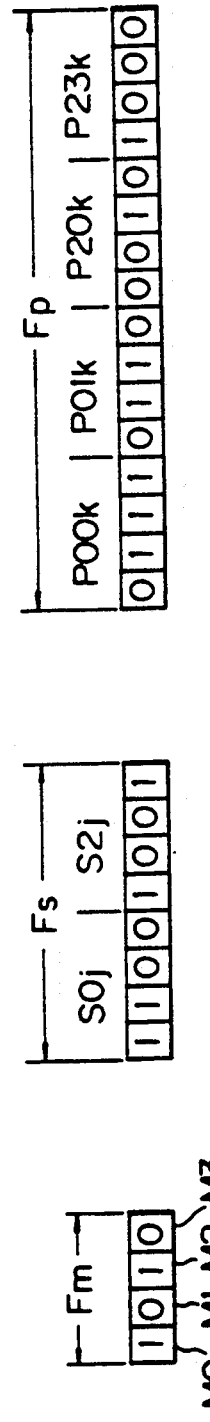

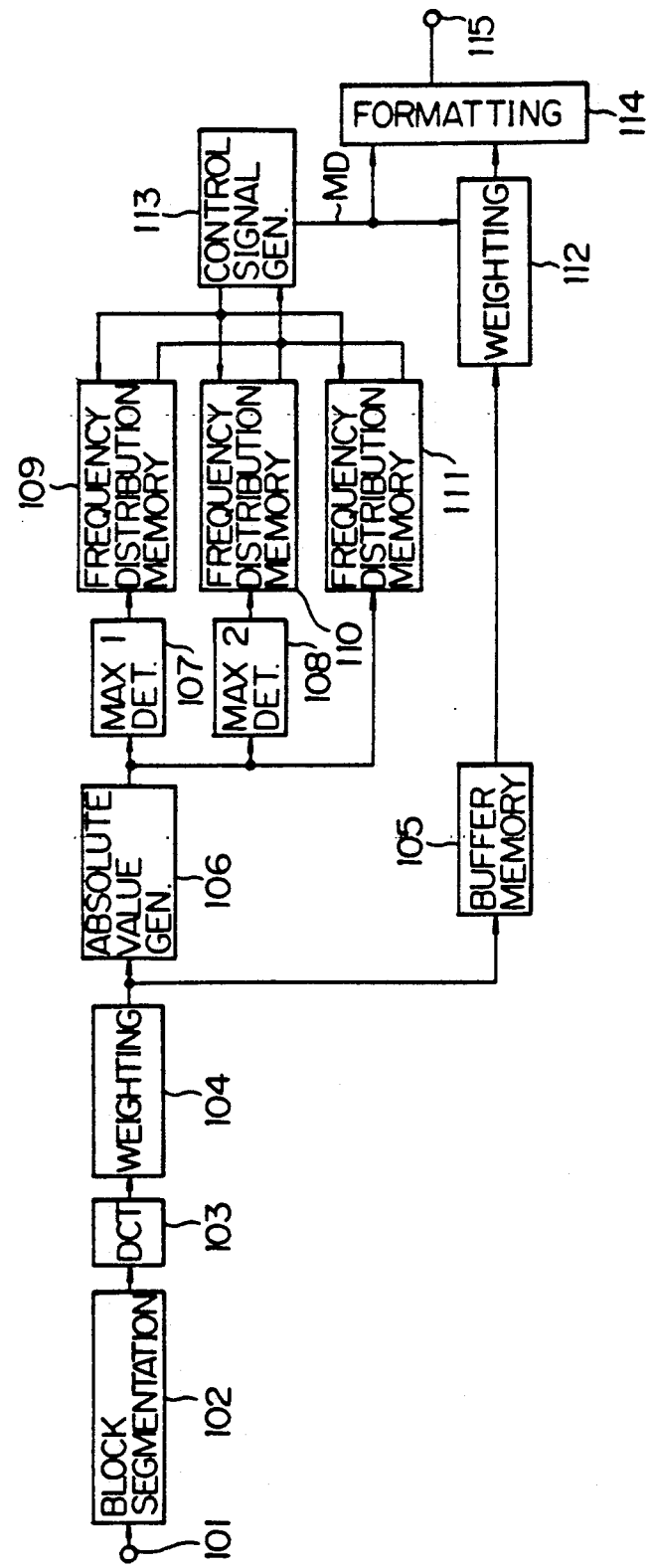

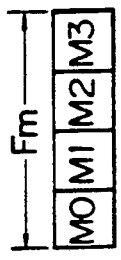 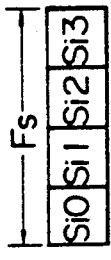 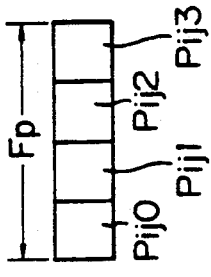
Fig.15B  Fig.15E  Fig.15H
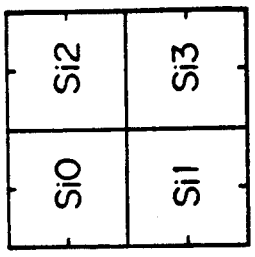 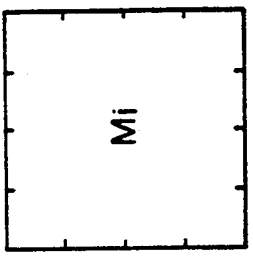 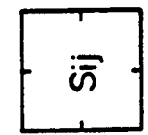
Fig.15D  Fig.15G
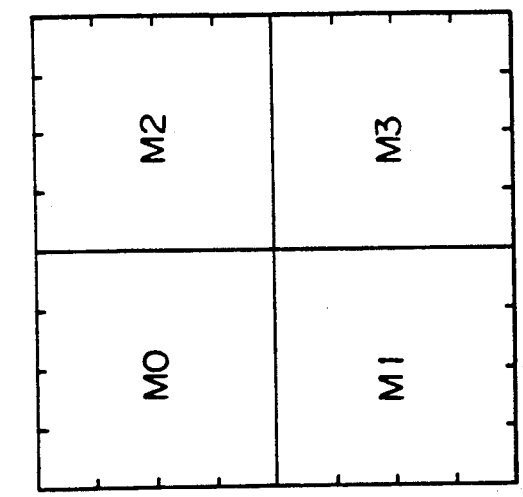
Fig.15A  Fig.15C  Fig.15F

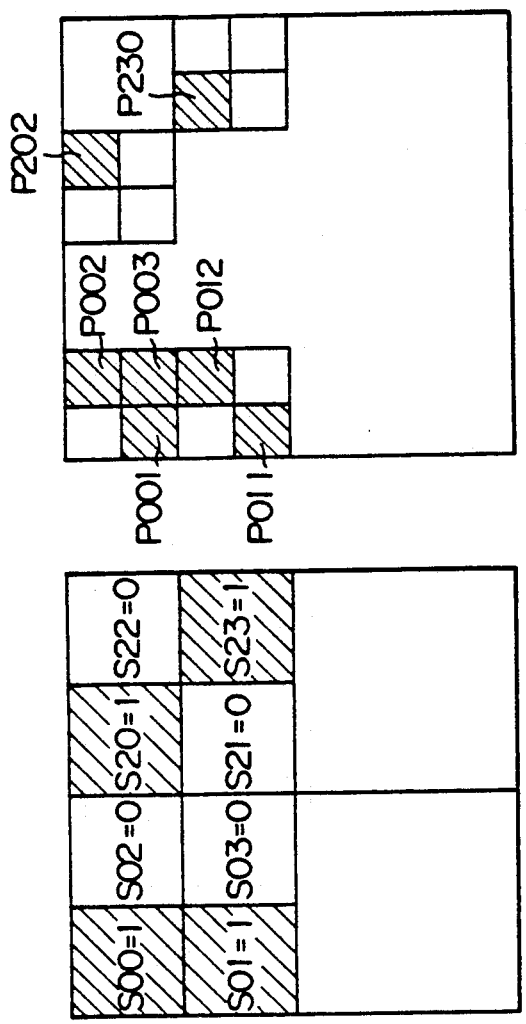
Fig. 16D
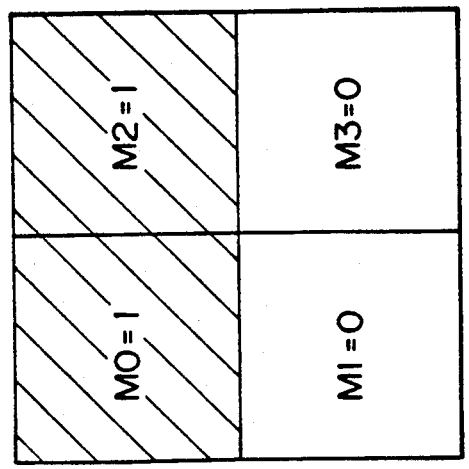

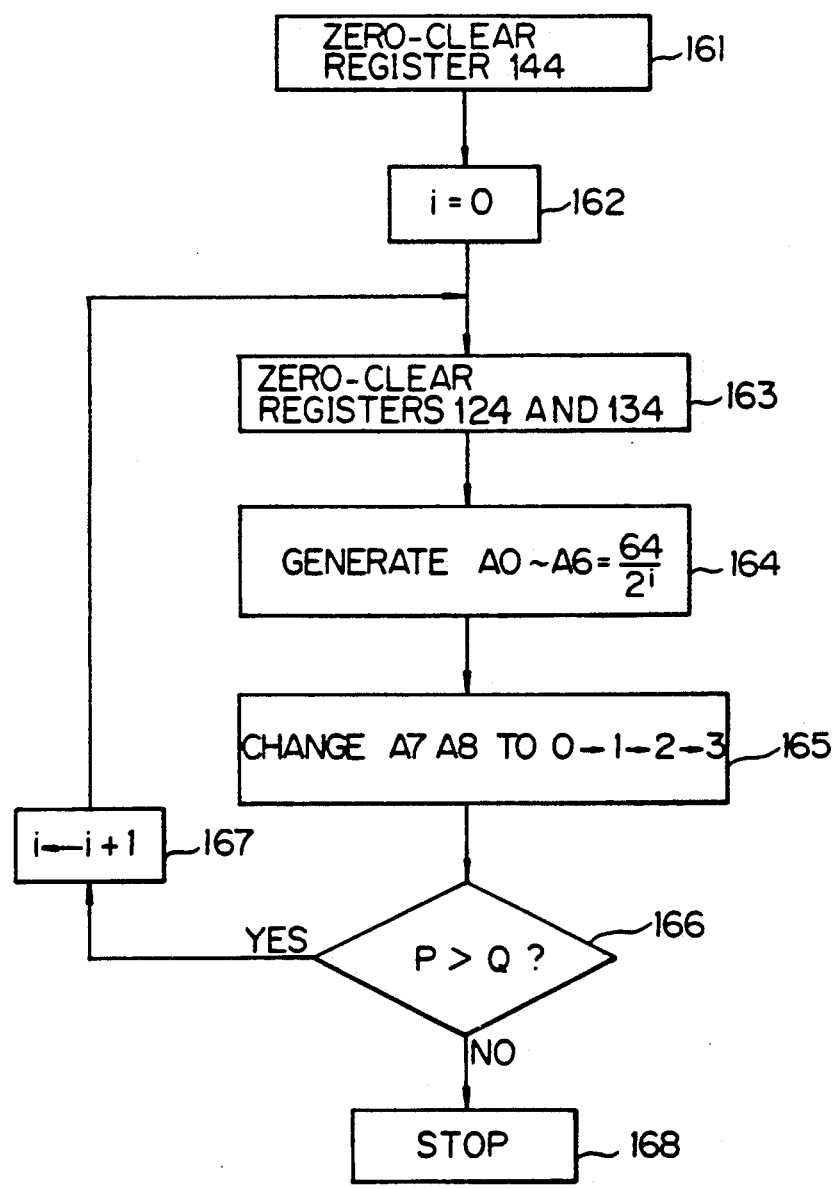

HIGHLY EFFICIENT CODING APPARATUS

BACKGROUND OF THE INVENTION

1. Field of the Invention

The present invention relates to a highly efficient coding apparatus for compressing and encoding a digital picture signal with discrete transform encoding such as discrete cosine transform and, more particularly, to buffering for controlling the amount of data transmission to a value less than a predetermined value.

2. Description of the Prior Art

A picture is divided into blocks, each having a predetermined number of picture elements. In order to suppress the redundancy of a picture signal, transform encoding is performed on a transform axis which matches the characteristic of an original picture signal for every block. Types of known transform encoding include Hadamard transform, cosine transform and Fourier transform. A conventional cosine transform encoding apparatus is shown in FIG. 1.

A sampled discrete picture signal f(j, k) is supplied through an input terminal 51, in FIG. 1, to a cosine transform (DCT) circuit 52 in which a discrete cosine transform, as indicated by the following equation, is performed. Here, the original data are two-dimensional data, that is, f(j, k) where (j, k=0, 1, ..., n−1), having (n x n) samples/block.

$$F(u, v) = \frac{4C(u)C(v)}{n^2} \sum_{j=0}^{n-1} \sum_{k=0}^{n-1} f(j, k) \times$$

$$\cos\left(\frac{(2j + 1)u\pi}{2n}\right)\cos\left(\frac{(2k + 1)v\pi}{2n}\right)$$

$$u, v = 0, 1, \ldots, n - 1$$

$$C(W) = \begin{cases} 1/\sqrt{2} & ; w = 0 \\ 1 & ; w = 1, 2, \ldots, n - 1 \end{cases}$$

A coefficient value F(u, v) from the cosine transform circuit 52 is supplied to a block scanning circuit 53, in which coefficient data within a block from a direct current component to a high frequency component are outputted by zigzag scanning. The coefficient data from the block scanning circuit 53 are supplied to a requantization circuit 54, in which the coefficient data are quantized which is controlled by a buffer control circuit 58. The output signal from the requantization circuit 54 is supplied to a sorting circuit 55, in which the coefficient data are sorted in order of the absolute values of the amplitudes and, in which the amplitudes and addresses are differentiated. A differential output signal from the sorting circuit 55 is given coupled to a variable-length encoding circuit 56, which is adapted to convert the signal into a code signal having a predetermined bit number by runlength coding and Haffman coding.

The code signal outputted from the variable-length encoding circuit 56 is supplied to a buffer memory 57 which converts the code signal transmission rate into a rate which does not exceed the rate of a transmission path. More specifically, the rate of data transmission to the input side of the buffer memory 57 is variable, whereas the output rate is nearly constant. The output data from buffer memory 57 are taken out at a terminal 59. A fluctuation of the transmission data rate is detected by the buffer memory 57 and, upon such detection, a detection signal is supplied to buffer control circuit 58.

The buffer control circuit 58 controls the quantization step for the requantization circuit 54, so that, coefficient data to be transmitted become a predetermined data amount by thresholding at the variable-length encoding circuit 56. Thresholding is a process in which a threshold value is subtracted from coefficient data whose absolute value is larger than the threshold value. Here, coefficient data F (0, 0) of a direct current component are excluded from thresholding.

In feedback type buffering as mentioned above, the feedback control of the quantization step and the threshold value is performed by the buffer control circuit 58, so that when the buffer memory 57 is nearly saturated and about to overflow, the transmission rate of the input data to the buffer memory 57 is lowered, whereas when the buffer memory 57 is relatively empty, the rate of the input data to the buffer memory is increased. If the sensitivity to the feedback amount is increased excessively for the feedback control, oscillation takes place in the vicinity of the object value. Conversely, when the sensitivity is too low, a problem develops, in that, it takes a relatively long time for convergence which necessitates increasing the capacity of the buffer memory 57. As a result, a considerable amount of know-how is required to utilize the conventional buffering process effectively.

A further disadvantage with the conventional feedback type buffering device is that complicated circuits, such as the sorting circuit 55 and the thresholding circuit, are required.

Further, although the transmission data amount in the conventional buffering system can be lowered on the average over a long period so as to be less than a predetermined value, it is difficult to control the data amount correctly for a unit of one field or one frame of a television signal as utilized, for example, in a digital VTR.

The present applicant has proposed a highly efficient coding apparatus which encodes utilizing (ADRC adaptive dynamic range coding) coefficient data previously obtained through transform encoding and suppresses the data amount of an encoded output at a value equal to or less than a predetermined value (refer to Japanese Patent Application Sho 63-245227). Although this system solves disadvantages associated with the conventional feedback type buffering and increases the data compression rate, by combining an ADRC encoding apparatus, the circuit becomes more complicated with increased data errors.

OBJECTS AND SUMMARY OF THE INVENTION

Accordingly, it is an object of the present invention to provide a highly efficient coding apparatus which avoids the above-mentioned disadvantages of the prior art.

More specifically, it is an object of the present invention to provide a highly efficient coding apparatus for enabling the total amount of data, during a predetermined period, to be less than the capacity of the transmission means through which the data are transmitted.

It is another object of the present invention to provide a highly efficient coding apparatus capable of lessening the time required to perform a buffering operation.

A further object of the present invention is to provide a highly efficient coding apparatus for transmitting data with a predetermined data pattern suitable for performing a buffering operation.

According to an aspect of the present invention, there is provided a highly efficient coding apparatus for encoding received digital video data in block format and compressing the digital video data if required into a number of bits so that the total number of bits in the digital video data to be transmitted is less than that of a predetermined transmission capacity, comprising:

- block segmentation means receiving the digital video data and for generating data in the block format,
- orthogonal transformation means receiving the block formatted data and for generating coefficient data having a direct current (DC) component and a plurality of alternating current (AC) components having a respective number of bits for each block,
- first generating means for generating a distribution table from the AC coefficient data during a predetermined period,
- second generating means for generating an accumulating distribution table from the first distribution table,
- control means for controlling the total bit number of the AC coefficient data generated during the predetermined period in response to the accumulating distribution table and the predetermined transmission capacity, and
- data transmitting means having the predetermined transmission capacity for transmitting the DC coefficient data, the controlled AC coefficient data and an additional code in each of the predetermined periods.

According to another aspect of the invention, there is provided a highly efficient coding apparatus for encoding received digital video data in block format and compressing the digital video data for transmission, comprising:

- block segmentation means receiving the digital video data and for generating data in the block format,
- orthogonal transformation means receiving the block formatted data and for generating coefficient data having a direct current (DC) component and a plurality of alternating current (AC) components for each block,
- sub-block segmentation means receiving the AC coefficient data of each block and for dividing the same into a plurality of sub-blocks,
- generating means for generating address information indicating which of the sub-blocks contain significant coefficient data, and
- data transmission means for transmitting the DC coefficient data, the address information, and the significant coefficient data for each block.

The above, and other objects, features and advantages of the present invention, will become readily apparent from the following detailed description of preferred embodiments of the invention when read in conjunction with the accompanying drawings in which corresponding components are identified by the same reference numerals.

BRIEF DESCRIPTION OF THE DRAWINGS

FIGS. 5A to 5C are schematic diagrams illustrating a sub-block construction;

FIG. 6 is a schematic diagram for describing a transmission patter of data;

FIGS. 7A and 7B are schematic diagrams for explaining the rule of quantizing AC coefficient data;

FIG. 8 is a block diagram of a distribution table generator;

FIG. 11 is a schematic diagram for describing an interesting type of distribution table;

FIG. 12 is a schematic diagram for describing another transmission pattern of data;

FIG. 14 is a block diagram of another embodiment of this invention;

FIGS. 15A to 15H are schematic diagrams for describing block patterns;

FIGS. 16A to 16D are schematic diagrams for describing transmission patterns of data;

FIG. 18 is a flow chart for explaining the operation of an embodiment of the present invention.

DETAILED DESCRIPTION OF THE PREFERRED EMBODIMENTS

Figure 1:
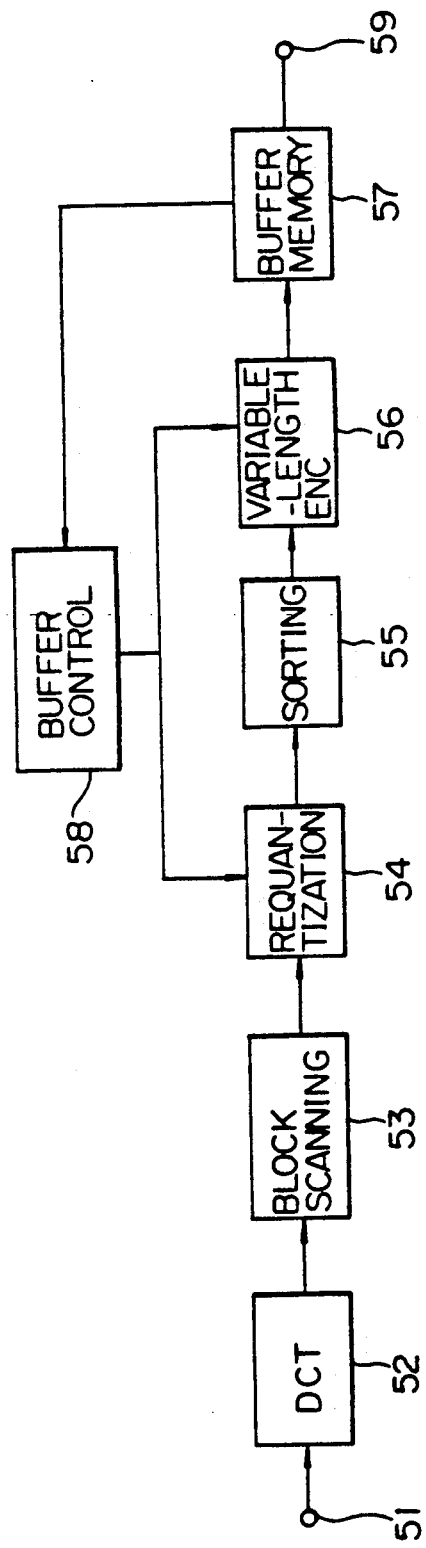
FIG. 1 is a block diagram illustrating a conventional transform encoding apparatus.
Figure 2:
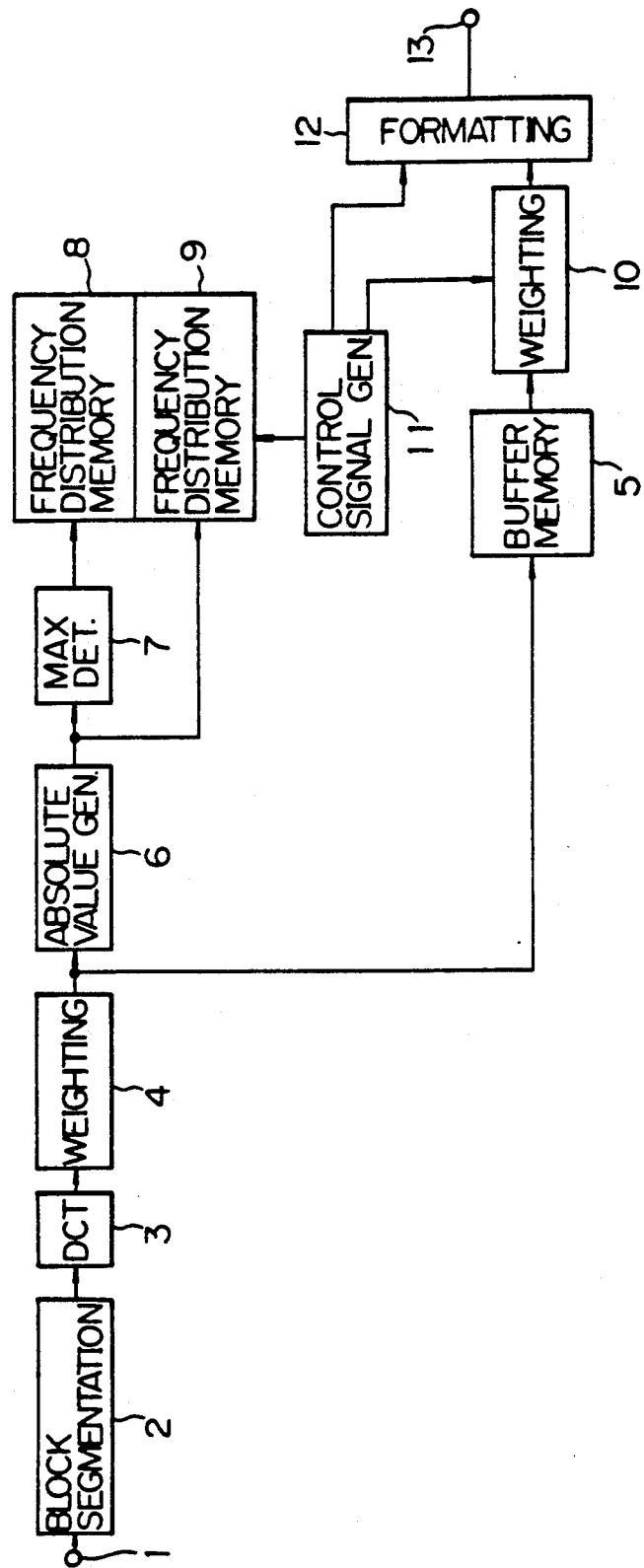
FIG. 2 is a block diagram illustrating a highly efficient coding apparatus according to one embodiment of this invention.
Figure 3:
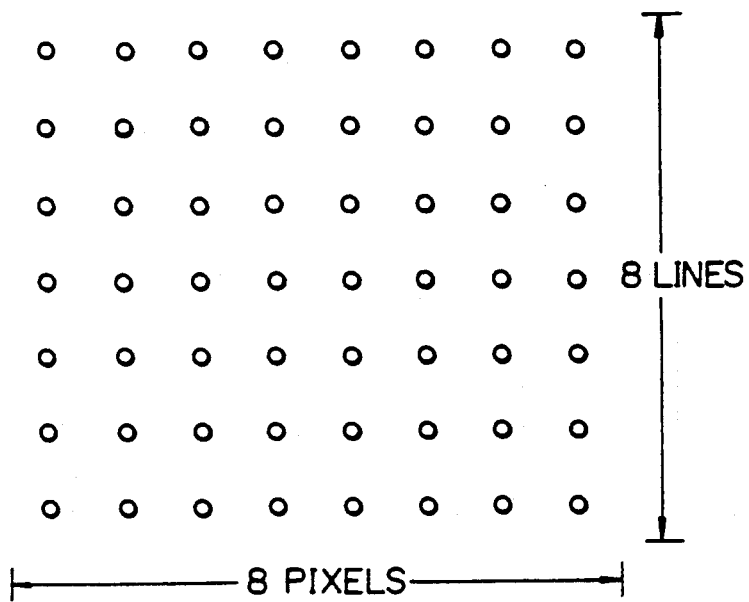
FIG. 3 is a schematic diagram for describing a block as a unit of process for encoding.

A highly efficient coding apparatus according to an embodiment of the present invention will be described with reference to the drawings. In FIG. 2, a sampled discrete digital picture signal is supplied through an input terminal 1 to a block segmentation circuit 2, in which a digital signal in a field is converted from the scanning order to the block order. FIG. 3 shows an example of a two-dimensional picture block of (8×8), that is, 8 picture elements in the horizontal direction and 8 lines in the vertical directions. In the case where the number of effective lines in one field is 240 and the number of effective samples per line is 720, in a system which has 525 lines per frame, there are 2700 blocks in one field, which is determined as follows:

$$(720 \times 240) \div (8 \times 8) = 2700$$

The output signal of the block segmentation circuit 2 is supplied to a cosine transform (DCT) circuit 3, in which a discrete cosine transform is performed by processing similar to the aforementioned conventional processing. A (8×8) coefficient table, corresponding to the block size, is obtained from the cosine transform circuit 3. Each coefficient value data, in the coefficient table, contains eight-bits of data including a sign ($\pm$) bit of, for example, one bit.

Figure 4:
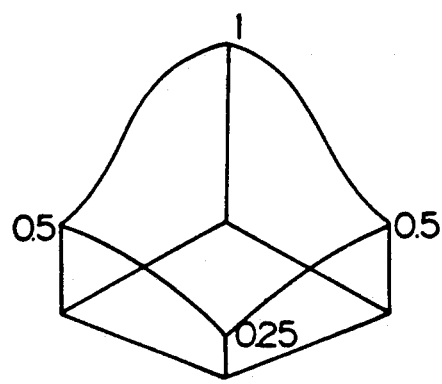
FIG. 4 is a schematic diagram for explaining an operation of a weighing circuit.

The coefficient data from the cosine transform circuit 3 are supplied to a weighting circuit 4, in which fixed weighting coefficients, as shown in FIG. 4, are multiplied by the (8×8) coefficient table. The weighting coefficients are set equal to 1 for a DC (direct current) component, and are smaller than one for higher order AC (alternate current) components. In other words, the higher the importance of the coefficients, the larger the weighting coefficients which are utilized.

Coefficient data from the weighting circuit 4 are supplied to both a buffer memory 5, composed of a one field memory, and an absolute value generating circuit 6. The coefficient date are converted into absolute values at the absolute value generating circuit 6 and are outputted to a maximum value detector 7 and a frequency distribution memory 9. The output signal of the maximum value detector 7 is supplied to a frequency distribution memory 8. The maximum value detector 7 detects a maximum value MAX of the absolute values of AC coefficients for every sub-block obtained from a block from DCT 3, that is, the above-mentioned (8×8) block is further divided into 16 (2×2) sub-blocks as shown in FIG. 5A. The sub-blocks, 0 to 15, are numbered in a zigzag scanning order as shown in FIG. 5B. The sub-block address is represented by four bits as, for example, shown in FIG. 5C.

The frequency distribution memories 8 and 9 perform a buffering process as hereinafter described. In frequency distribution memory 8, the frequency distribution of the maximum values MAX in a sub-block of AC coefficients, which were previously converted into absolute values, are stored. The maximum values MAX are accumulated for a period corresponding to one field and used to form an accumulated frequency distribution table. In frequency distribution memory 9, the frequency distribution of the AC coefficients, which were converted into absolute values, are stored and accumulated for a period of one field and used to form an accumulated frequency distribution table.

The buffer memory 5 has a memory capacity of one field which is the unit of the buffering process. Coefficient data from the buffer memory 5 are supplied to a weighting circuit 10. In the weighting circuit 10, which is provided for the buffering process, a controlled-weighting coefficient is multiplied by the coefficient data, so that the amount of transmission data, that is, the transmission bit number, per field does not exceed a predetermined object value. The maximum value of the weighting coefficients is 1, so that as the weighting coefficients decrease, and become for example $\frac{1}{2}, \frac{1}{4}, \frac{1}{8}$, 1/16, 1/32, 1/64, and so forth, the amount of data to be transmitted decreases. The object is subject to the AC components to the buffering process, whereas the DC components, which are of high importance, are transmitted in the original data form.

Addresses for the frequency distribution memories 8 and 9, and a mode signal for designating a weighting coefficient for the weighting circuit 10 are developed at a control signal generating circuit 11. Coefficient data from the weighting circuit 10 and the mode signal from the circuit 11 are supplied to a format development circuit 12, in which transmission data are generated and supplied to an output terminal 13 of the format development circuit 12 for transmitting to a transmission path. An example of such a transmission path is a process for magnetic recording/reproduction. In the format development circuit 12, the addition of a synchronization pattern for transmission, processing for error correction encoding and so forth are made when necessary. The processing including, for example, the calculation of the transmission bit number can be done in a data-dropping period of the input data, that is, the vertical blanking period. The weighting process is for data read out of the buffer memory 5 in the next field period and depends on the mode determined from the preceding field.

FIG. 6 shows a structure of transmission data in which data of a sub-block 0 are positioned first and data of sub-blocks whose data are not zero are subsequently positioned. In FIG. 6, DC represents data of the zero-th sample of the sub-block 0, that is, data indicative of a direct current component. DC data are always transmitted with eight bits. Ai represents a four-bit address data for indicating that data of the i-th sub-block are to follow. Pi represents four-bit data for indicating the number of samples to be sent in the i-th sub-block. In Pi, "1" indicates a sample having a value which is not 0, that is, a significant sample, and its value is encoded in the DATAi portion of the data. On the other hand, in Pi, "0" indicates a sample having a value 0 which is not transmitted. For example, when P1 is (0101), as shown in FIG. 6, the values of the zero-th and the second samples of the sub-block 1 are 0, the values of the first and the third samples are not 0, and the non-zero values are encoded in the DATAi portion.

The coefficient data provided by the cosine transform are represented by 8 bits including the sign ($\pm$) bit. These coefficient data are converted into a transmission signal, at the format development circuit 12. FIG. 7A indicates AC coefficient values and codes of the coefficient data provided by the DCT3. As shown, ai represents (i+1) bits of the AC coefficient data. This coefficient data are converted into transmission data having a bit pattern as indicated in FIG. 7B.

The bit pattern of the transmission data is composed by inserting a bit of "0" or "1" between original bits and a sign bit S at the head, in which "0" prior to the sign bit S means +, and "1" means −. Further, a "1" is added prior to the last bit. As a result, the last bit sequence becomes ("1"S) or ("1"a0) which separates the bit sequences so as to enable the transmission data to be decoded into coefficient data on the reception side.

FIG. 8 shows a more detailed portion with the buffering process according to an embodiment of the present invention. An absolute value of an AC coefficient from the absolute value generating circuit 6 is supplied to the maximum value detector 7, in which a maximum value MAX for each sub-block is detected. The maximum value is supplied to a multiplexer 21, and the output signal therefrom is supplied as a seven-bit address for the frequency distribution memory 8. The absolute value of the AC coefficient from circuit 6 is further supplied to a multiplexer 31, and the output signal therefrom is supplied as a seven-bit address for the frequency distribution memory 9.

Data read out from the frequency distribution memory 8 are supplied to an adder 22 and added to the output of a multiplexer 23. Multiplexer 23 receives as input signals 0, +1 and the output signal of a register 24, and selects one of these input signals as an output signal to be supplied to the adder 22. The output signal of the adder 22 is supplied to register 24. The output signal of the register 24 is fed back to the multiplexer 23, as previously described, and multiplied by 8 in a multiplier 25. The output signal of the multiplier 25 is coupled to an adder 36.

In a similar manner to that previously described for frequency distribution memory 8, an adder 32, a multiplexer 33, a register 34 and a multiplier (2x circuit) 35 are provided for frequency distribution memory 9. The multipliers 25 and 35 can be composed of a shift circuit.

As hereinafter described, the number of transmission bits of AC coefficients is obtained at the output of adder 36, and supplied to a comparator 37. An object value of the number of transmission bits is coupled to the comparator 37 from a terminal 38, and a detection is made on whether the calculated transmission bit number is larger or smaller than the object value.

The comparison output signal from comparator 37 is supplied to a mode generator 41 in control signal generating circuit 11, which is indicated by a block formed of broken lines. The mode generator 41 generates a mode control signal MD of, for example, three bits. The mode control signal MD is supplied to an address generator 42 and a register 43 which receives the comparison output signal from the comparator 37 as a clock signal. When the transmission bit number Q is smaller than the object value P, the comparison output signal generated from the comparator 37, and acting as a clock signal for register 43, permits the mode control signal MD to be fed into the register 43. An address signal developed by the address generator 42 is supplied to the multiplexers 21 and 31.

The modes controlled by the mode control signal MD are as follows:

mode 1: AC coefficient is transmitted as is.

mode 2: AC coefficient is multiplied by $\frac{1}{2}$ and transmitted.

mode 3: AC coefficient is multiplied by $\frac{1}{4}$ and transmitted.

mode 4: AC coefficient is multiplied by $\frac{1}{8}$ and transmitted.

mode 5: AC coefficient is multiplied by 1/16 and transmitted.

mode 6: AC coefficient is multiplied by 1/32 and transmitted.

mode 7: AC coefficient is multiplied by 1/64 and transmitted.

The mode control signal MD from the register 43 is supplied to the weighting circuit 10, indicated by a broken line block. The weighting circuit 10 is generally constituted by a ROM 44 and a multiplier 46. The ROM 44 is supplied, as an address, with the mode control signal MD from the register 43 and a sub-block number generated at a counter 45, and generates a weighting coefficient. At the multiplier 46, coefficient data from the buffer memory 5 and the weighting coefficient read out of the ROM 44 are multiplied together. The output data of the multiplier 46 are supplied to the format development circuit 12 so as to be converted into transmission data together with the mode control signal MD.

The supply of the sub-block number from the counter 45 enables multiplication of a finer weighting coefficient to be performed rather than of a constant weighting coefficient, such as $\frac{1}{2}$ by the AC coefficient. For example, it is possible to multiply different weighting coefficients by the sub-blocks 0 to 5 and the sub-blocks 6 to 15. However, when such weighting is performed, a pair of the frequency distribution memories 8 and 9 are separately required for the sub-blocks 0 to 5 and the sub-blocks 6 to 15.

Figure 9:
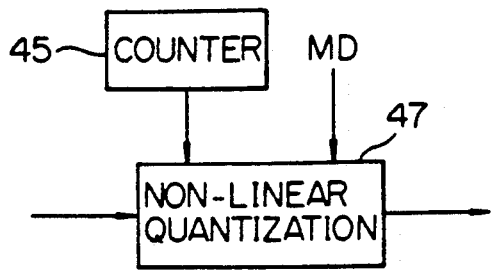
FIG. 9 is a block diagram of a controller for controlling the amount of data.

A non-linear quantization circuit 47, as shown in FIG. 9, may be used instead of the weighting circuit 10. The non-linear quantization circuit 47 is, for example, composed of a ROM. The sub-block number from the counter 45 and a mode control signal MD are supplied to the non-linear quantization circuit 47 and an output signal is provided therefrom which is requantized with a quantization step depending on the mode. For example, when it is desired to decrease the transmission bit number, data are requantized with a large quantization step.

To maintain the transmission bit number per field at a value smaller than an object value, the transmission bit number is calculated in mode 1, that is, where the weighting coefficient is 1, the transmission bit number and the object value are then compared in the comparator 37, and when the transmission bit number is smaller than the object value, the AC coefficient data weighted in mode 1 are transmitted. Conversely, when the transmission bit number is larger than the object value, the transmission bit number is calculated in mode 2, that is, where the weighting coefficient is $\frac{1}{2}$, and the transmission bit number is compared with the object value. The modes are switched from mode 1 through mode 7 sequentially until the transmission bit number becomes smaller than the object valve.

The calculation of the transmission bit number will now be explained using as an example 2700 blocks/field.

Referring to FIG. 6, A0, P0 and DC in the transmission data must be transmitted in all blocks so that, $(4+4+8) \times 2700 = 43200$ bits/field are a fixed data amount. As the bit numbers of Ai, Pi, and DATAi are variable, and since it is necessary to know these bit numbers, a comparison of the variable bit numbers is performed at comparator 37.

A description will now be given on the calculation of the data amount of address data Ai (four bits) of a sub-block i and data Pi (four bits) of a sample number of the sub-block i.

In the case where Ai and Pi data must be sent, there is at least one AC coefficient having a value other than zero in each sub-block. Therefore, it is sufficient only to focus on the maximum value MAX of the AC coefficients of each sub-block. The frequency distribution of the maximum value MAX of the absolute values of the AC coefficients in the sub-blocks 1 to 15 of all blocks in one field is developed, and converted into an accumulated frequency distribution.

The frequency distribution memory 8 is cleared prior to writing in the data, so that adder 22 generates zero data at the time of the clear operation. Sequentially changing addresses from the address generator 42 of the control signal generating circuit 11 are supplied through the multiplexer 21 to the memory 8, so that zero data are written into all addresses. After the clear operation, the multiplexer 21 selects the maximum value MAX detected at the maximum value detector 7, and the multiplexer 23 selects an input of +1. Data at an address designated by the maximum value MAX are read out of the memory 8 and added to +1 at the adder 22. The output data of the adder 22 are written into the same address as the input data of memory 8. This processing is performed for one field period, whereupon the frequency distribution of the maximum value MAX of the absolute values of the AC coefficients is stored in the frequency distribution memory 8.

In a manner similar to that hereinbefore described for frequency distribution memory 8, the frequency distribution memory 9 is initially cleared to zero, and the content of the memory 9 is added by +1 at the adder 32 and written into the same address using the absolute value of the AC coefficient as its address, so that a frequency distribution table, corresponding to one field period of the absolute values of the AC coefficients, is formed in memory 9. After the frequency distribution tables corresponding to one field period are formed in the memories 8 and 9, accumulated frequency distribution tables.

For forming an accumulated frequency distribution table, the multiplexers 21 and 31 are switched so as to select the output of the address generator 42 of the control signal generating circuit 11, and the multiplexers 23 and 33 are switched so as to select the respective outputs of the registers 24 and 34. The address generator 42 generates decrementing addresses such as (127, 126, 125, ..., 2, 1). A read-out output of each address is added to the outputs of registers 24 and 34 at the adders 22 and 32, respectively. The registers 24 and 34 are reset at zero prior to forming an accumulated frequency distribution table. Therefore, a value obtained by accumulating the value from the address 127 is written into the memories 8 and 9. After the addresses of the memories 8 and 9 have been processed, as previously described, from the address 127 to the address 1, an accumulated frequency distribution table is developed in each memory.

Figure 10A:
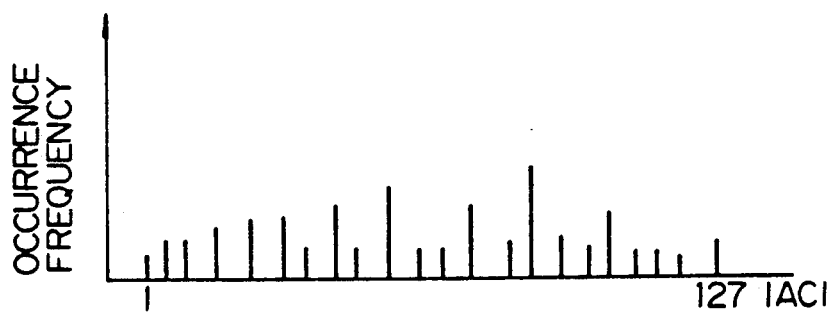
FIGS. 10A and 10B are schematic diagrams for describing distribution tables.
Figure 10B:
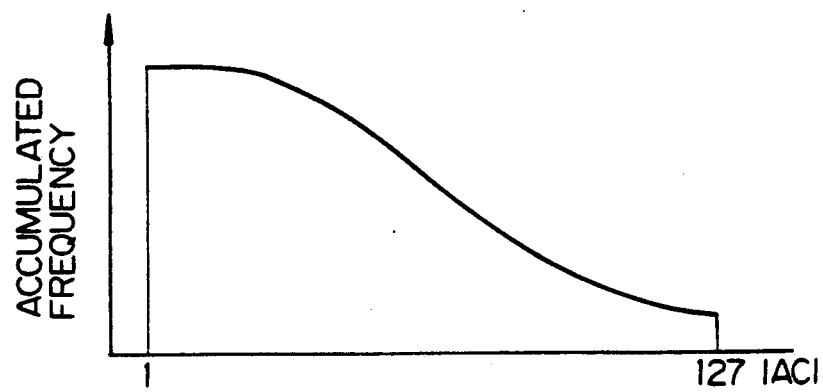

FIG. 10A is a frequency distribution graph in which the maximum value MAX of the absolute values of the AC coefficients is selected as a traverse axis, while the occurrence frequency is selected as a vertical axis. The accumulation of the frequency distribution from 127 toward 1 results in an accumulated frequency distribution graph as shown in FIG. 10B. This accumulated frequency distribution graph, when the weighting coefficients are multiplied by the AC coefficients, permits the number of the sub-blocks with the maximum value MAX of 0 and the number of the sub-blocks to be transmitted to be seen.

When the accumulated frequency distribution graph formed in the memory 8 is, for example, the graph shown in FIG. 11, the bit numbers of Ai, and Pi to be transmitted can be obtained immediately as described below.

*In the case where coefficient data are directly used (mode 1),
the number of sub-blocks for sending Ai, Pi: M1 the transmission bit number: 8M1
*In the case where coefficient data are multiplied by $\frac{1}{2}$ (mode 2),
the number of sub-blocks for sending Ai, Pi: M2 the transmission bit number: 8M2
*In the case of the multiplication of coefficient data by $\frac{1}{4}$ (mode 3),
the number of sub-blocks for sending Ai, Pi: M3 the number of transmission bits: 8M3
*In the case of the multiplication of coefficient data by $\frac{1}{8}$ (mode 4),
the number of sub-blocks for sending Ai, Pi: M4 the number of transmission bits: 8M4
*In the case of the multiplication of coefficient data by 1/16 (mode 5),
the number of sub-blocks for sending Ai, Pi: M5 the number of transmission bits: 8M5
*In the case of the multiplication of coefficient data by 1/32 (mode 6),
the number of sub-blocks for sending Ai, Pi: M6 the number of transmission bits: 8M6
*In the case of the multiplication of coefficient data by 1/64 (mode 7),
the number of sub-blocks for sending Ai, Pi: M7 the number of transmission bits: 8M7

The number of sub-blocks of coefficient data multiplied by $(1/\sqrt{2})$, $(1/\sqrt{2})^3$, $(1/\sqrt{2})^5$ and so forth, can be obtained from the values of 3, 6 and 12, respectively, along the horizontal axis of the accumulated frequency distribution table. Further, even when non-linear quantization is performed, the number of the sub-blocks can be seen. Thus, since the data amount of Ai and Pi to be transmitted can be detected when a weighting coefficient is multiplied by the coefficient data, that is, the coefficient data, buffering for suppressing the data amount an amount less than a predetermined amount is possible.

As previously mentioned, after a cumulative frequency distribution table is formed in the frequency distribution memory 8, the multiplexer 21 is switched so as to select an address from the address generator 42, and the multiplexer 23 is switched so as to select 0. The address generator 42 generates addresses which change sequentially as, for example (64, 32, 16, 8, 4, 2, 1). Since data from the memory 8 are not altered in the adder 22, data read out from the above-mentioned addresses are the accumulated frequencies M7, M6, M5, M4, M3, M2, M1, respectively. These accumulated frequencies are multiplied by 8 at the multiplier 25, and the output of the multiplier 25, which is indicative of the number of sub-blocks sending Ai and Pi data, is supplied to the adder 36.

In calculating the data amount of the data DATAi to be sent, the occurrence frequency of the absolute values of all AC coefficients is obtained as mentioned above and an accumulated frequency distribution graph (table) similar to FIG. 11 is generated. Assuming that FIG. 11 is an accumulated frequency distribution graph of the AC coefficients formed in the memory 9, the transmission bit number, when the conversion of transmission data is made in accordance with FIG. 7, is determined as follows. Here, the bit number represents the bit number of the absolute value of the AC coefficient which is along the traverse axis of the accumulated frequency distribution graph, and a reference Ni is utilized in place of Mi as a frequency value so as to distinguish it from Ai and Pi.

*The sample number of the seven-bit AC coefficient: N7
The number of transmission bits: 14N7 bits
*The sample number of the six-bit AC coefficient: N6-N7
The number of transmission bits: 12(N6-N7) bits
*The sample number of the five-bit AC coefficient: N5-N6
The number of transmission bits: 10 (N5-N6) bits
*The sample number of the four-bit AC coefficient: N4-N5
The number of transmission bits: 8(N4-N5) bits
*The sample number of the three-bit AC coefficient: N3-N4
The number of transmission bits: 6(N3-N4)
*The sample number of the two-bit AC coefficient: N2-N3
The number of transmission bits: 4(N2-N3)
*The sample number of the one-bit AC coefficient: N1-N2
The number of transmission bits: 2(N1-N2)

Consequently, the total bit number of the transmission data amount when the weighting coefficient is 1, as in mode 1, is: 2(N1+N2+N3+N4+N5+N6+N7)

bits. In mode 2, where the absolute value of an AC coefficient is multiplied by ½, the bit number of the AC coefficient is reduced by one bit so that a two-bit AC coefficient becomes a one-bit AC coefficient. As a result, the total bit number is: $12N7 + 10(N6 - N7) + 8(N5 - N6) + 6(N4 - N5) + 4(N3 - N4) + 2(N2 - N3) = 2(N2 + N3 + N4 + N5 + N6 + N7)$ bits.

In mode 3 where the absolute value of an AC coefficient is multiplied by ¼, the total bit number is: $2(N3 + N4 + N5 + N6 + N7)$ bits.

In mode 5 where the absolute value of an AC coefficient is multiplied by 1/16, the total bit number is: $2(N5 + N6 + N7)$ bits.

In mode 6 where the absolute value of an AC coefficient is multiplied by 1/32, the total bit number is: $2(N6 + N7)$ bits.

In mode 7 where the absolute value of an AC coefficient is multiplied by 1/64, the total bit number is: $2N7$ bits.

In addition, even when the multiplication of $(1/\sqrt{2})$ $(1/\sqrt{2})^3$ $(1/\sqrt{2})^5$ and so forth, is performed or when non-linear requantization is done, as in the previously described case of Ai and Pi, the transmission bit number is similarly obtained. Thus, in the case where a weighting coefficient is multiplied by the coefficient data, that is, the AC coefficient data, knowing the data amount of DATAi enables buffering for suppressing the data amount an amount less than a predetermined amount.

As previously described, after a cumulative frequency distribution table is formed in the frequency distribution memory 9, the number of transmission bits is detected. In performing this detection, the multiplexer 31 is switched so as to select an address from the address generator 42, and the multiplexer 33 is switched so as to select the output of the register 34. The address generator 42 generates addresses which change sequentially as, for example, (64, 32, 16, 8, 4, 2, 1), as mentioned above. Since data from the memory 9 and data of a previous address stored in the register 34 are added at the adder 32, the data read out from the above-mentioned addresses are the accumulated frequency distribution N7, (N7+N6), (N7+N6+N5), (N7+N6+N5+N4) (N7+N6+N5+N4+N3), (N7+N6+N5+N4+N3+N2), (N7+N6+N5+N4+N3+N2+N1). These accumulated frequencies are multiplied by two at the multiplier 35, and the output of the multiplier 35, which is indicative of the number of transmission bits of the AC coefficients, is supplied to the adder 36.

The number of transmission bits, excluding the number of fixed bits, is compared with an object value in the comparator 37 so as to determine whether the number of transmission bits is larger or smaller than the object value. Mode generator 41 determines whether it is necessary to advance a mode, so as to reduce the transmission bit number, based on the comparison output from comparator 37. For example, to obtain the transmission bit number at mode 2, in which the weighting coefficient of ½ is multiplied by an AC coefficient, addresses of (64, 32, 16, 8, 4, 2) are outputted from the address generator 42, and it is determined whether the transmission bit number calculated based on the addresses, in a manner similar to that previously described, is larger or smaller than the object value.

As hereinbefore mentioned, the mode in which the transmission bit number becomes smaller than the object value is determined, whereupon the AC coefficient delayed at the buffer memory 5 is multiplied by the weighting coefficient corresponding to the mode at the weighting circuit 10.

As is apparent from the foregoing explanation, the transmission bit number per field in each mode can be represented by the following equation:

*In the case of mode 1 where coefficient data are directly employed, $16 \times 2700 + 8M1 + 2(N1 + N2 + N3 + N4 + N5 + N6 + N7)$ bits

*In the case of mode 2 where coefficient data are multiplied by ½, $16 \times 2700 + 8M2 + 2(N2 + N3 + N4 + N5 + N6 + N7)$ bits

*In the case of mode 3 where coefficient data are multiplied by ¼, $16 \times 2700 + 8M3 + 2(N3 + N4 + N5 + N6 + N7)$ bits

*In the case of mode 4 where coefficient data are multiplied by ⅛, $16 \times 2700 + 8M4 + 2(N4 + N5 + N6 + N7)$ bits

*In the case of mode 5 where coefficient data are multiplied by 1/16, $16 \times 2700 + 8M5 + 2(N5 + N6 + N7)$ bits

*In the case of mode 6 where coefficient data are multiplied by 1/32, $16 \times 2700 + 8M6 + 2(N6 + N7)$ bits

Figure 13:
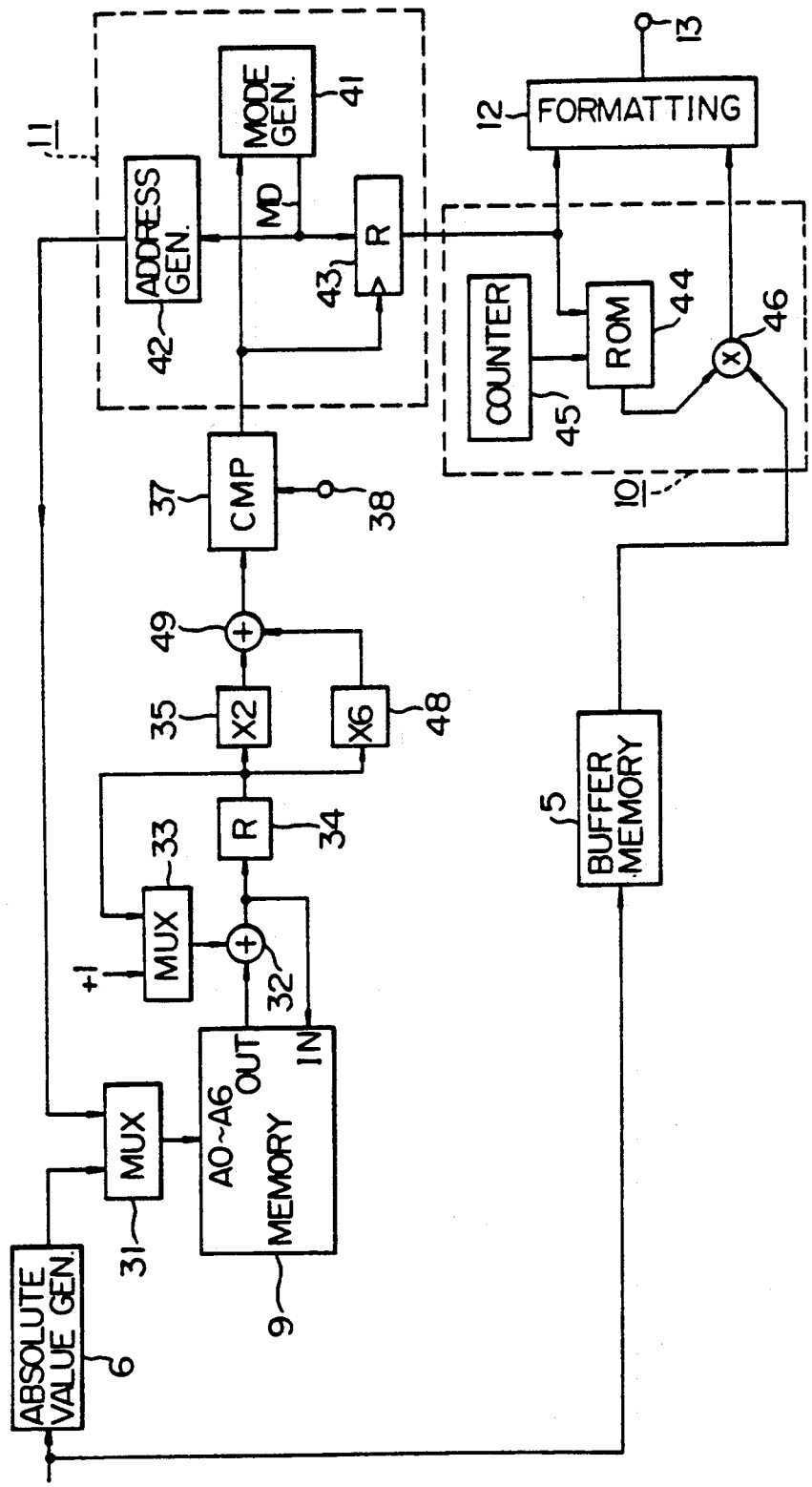
FIG. 13 is a block diagram of another distribution table generator according to another embodiment of the present invention.

*In the case of mode 7 where coefficient data are multiplied by 1/64, $16 \times 2700 + 8M7 + 2N7$ bits FIGS. 12 and 13 show another embodiment of the present invention in which DC coefficient data and a plurality of significant AC coefficient data which are generated corresponding to the (8×8) DCT block are transmit DCT block is not divided into sub-blocks as in the above mentioned embodiment.

FIG. 12 shows a structure of transmission data in which the data of the direct current component DC (8 bits) are positioned first followed by the address code ADi and the significant coefficient data ACi in sequential pairs. Since sixty-four pieces of coefficient data are generated from each block, the addresses (0 to 63), in which 0 is the address of the coefficient data DC, are allotted according to a predetermined order, for example, zigzag scanning order. The coefficient data ACi are the transmission data obtained by the conversion shown in FIGS. 7A and 7B and as previously described. The data EOB are added after the last AC coefficient data component so as to indicate the end of one block of transmission data.

The frequency distribution memory 8, provided in the above mentioned embodiment, is not necessary as the sub-block structure is not utilized in this embodiment. A portion of this embodiment with the buffering process is constituted as shown in FIG. 13.

In FIG. 13, the absolute value of the AC coefficient is supplied to a multiplexer 31, which outputs a seven bit address signal to frequency distribution memory 9.

Data from frequency distribution memory 9 and an output signal from a multiplexer 33 are supplied to an adder 32 and added together. A, +1 and an output signal of a register 34 are supplied to the multiplexer 33, which selectively supplies one of these input signals to the adder 32. The output signal of the adder 32 is supplied to register 34. As has and, as previously mentioned, the output signal of the register 34 is fed back to the multiplexer 33. The output signal of the register 34 is multiplied by 2 and 6 in multipliers 35 and 48, respectively. The output signals of multipliers 35 and 48 are supplied to an adder 49 which outputs a signal to a comparator 37. The output signals from multipliers 35 and 48 indicate the number of transmission bits of AC coefficient data and the number of transmission bits of address code, respectively. Thus, the output signal of the adder 49 represents the sum of these transmission bits.

An object value representing the number of transmission bits is supplied to the comparator 37 from a terminal 38. At comparator 37, a determination is made as to whether the calculated transmission bit number is larger or smaller than the object value.

The comparison output signal from comparator 37 is supplied to a mode generator 41 in control signal generating circuit 11, which is indicated by a block formed of broken lines. The control signal generating circuit 11 includes address generator 42 and register 43 which function in a manner similar to that hereinbefore described with reference to the previous embodiment. The mode control signal MD from register 43 is supplied to weighting circuit 10 which, operates in a manner similar to that described for the previous embodiment.

As described in the previous embodiment, to maintain the transmission bit number per field at a value smaller than an object value, the transmission bit number is calculated in mode 1, that is, where the weighting coefficient is 1, the transmission bit number and the object value are then compared in the comparator 37, and if the transmission bit number is smaller than the object value, the AC coefficient data weighted in mode 1 are transmitted. Conversely, when the transmission bit number is larger than the object value, the transmission bit number is calculated in mode 2, that is, where the weighting coefficient is ½, and the transmission bit number is compared with the object value. The modes are switched from mode 1 through mode 7 sequentially until the transmission bit number becomes smaller than the object value.

The calculation of the transmission bit number will now be described using as an example 2700 blocks/field.

DC component data and data EOB, which indicates the end of a block, are transmitted for every block. Hence, $(8+14) \times 2700 = 59400$ bits/field are a fixed data amount. As the bit numbers of the address code ADi and the AC coefficient data are variable, and since it is necessary to know these bit numbers, a comparison of the variable bit numbers is performed at comparator 37.

In order to calculate the total data amount of the address code ADi (6 bits) and the data ACi of all the AC components, the frequency distribution of the absolute values of the AC coefficients is developed and converted into an accumulated frequency distribution.

Assuming that FIG. 11 is an accumulated frequency distribution graph of the AC coefficients formed in the memory 9, the transmission bit number, when the conversion of transmission data is made in accordance with FIG. 7, is determined as follows. Here, the bit number represents the bit number of the absolute value of the AC coefficient which is along the traverse axis of the accumulated frequency distribution graph, and a reference Ni is employed as a frequency value. *The sample number of the seven-bit AC coefficient: N7

The number of transmission bits of the address code: 6N7

The number of transmission bits: 14N7

*The sample number of the six-bit AC coefficient: N6-N7

The number of transmission bits of the address code: 6(N6-N7)

The number of transmission bits: 12(N6-N7)

*The sample number of the five-bit AC coefficient: N5-N6

The number of transmission bits of the address code: 6 (N5-N6)

The number of transmission bits: 10(N5-N6)

*The sample number of the four-bit AC coefficient: N4-N5

The number of transmission bits of the address code: 6 (N4-N5)

The number of transmission bits: 8(N4-N5)

*The sample number of the three-bit AC coefficient: N3-N4

The number of transmission bits of the address code: 6 (N3-N4)

The number of transmission bits: 6(N3-N4)

*The sample number of the two-bit AC coefficient: N2-N3

The number of transmission bits of the address code: 6(N2-N3)

The number of transmission bits: 4(N2-N3)

*The sample number of the one-bit AC coefficient: N1-N2

The number of transmission bits of the address code: 6 (N1-N2)

The number of transmission bits: 2(N1-N2)

Consequently, the total bit number of the transmission data amount when the weighting coefficient is 1, as in mode 1, is : $6N1+2(N1+N2+N3+N4+N5+N6+N7)$ bits. The total bit number in mode 2 through mode 7, in which the absolute value the AC coefficient is multiplied by ½, ¼, ⅛, 1/16, 1/32, 1/64, respectively is similarly calculated as previously described.

The calculation of the number of transmission bits of AC coefficient data for every mode can be performed based on the accumulated frequency distribution data stored in the memory 9 in a manner similar to that described in the aforementioned embodiment. The data corresponding to the number of transmission bits are outputted from the adder 49. The mode in which the number of transmission bits is smaller than the object value is determined, whereupon the corresponding weighting is performed at the weighting circuit 10.

In the above embodiment, data in one field are divided into picture blocks such as $(8 \times 8)$. However, data in a frame may be divided into blocks and, to improve the compression rate, a block may be formed of picture data of two frames. FIGS. 12 and 16A show two examples for forming blocks based on two frames of picture data.

Additionally, in the format development circuit 12, processings such as error correction encoding and the addition of a synchronization pattern may be performed. The increase in the transmission bit number due to these processings is a fixed amount.

An input picture signal is not limited to a luminance signal of a television signal, but can include a color picture component signal. These components may be processed simultaneously or separately.

Cosine transform, orthogonal transform, and so forth may be employed as transform codes.

Another embodiment of the present invention will now be described with reference to FIGS. 14–18.

FIG. 14 is a block diagram illustrating the entire system of this embodiment. In FIG. 14, a sampled discrete picture signal is supplied through an input terminal 101 to a block segmentation circuit 102. In the block segmentation circuit 102, a digital signal in a field is converted from a scanning order to a block order. Since the block structure is similar to that described with reference to FIG. 3 in the first embodiment, a detail description will not be repeated.

The output signal of the block segmentation circuit 102 is supplied to a cosine transform (DCT) circuit 103, in which a discrete cosine transform is performed by processing similar to the previously described conventional processing. A (8×8) coefficient table, corresponding to the block size, is obtained from the cosine transform circuit 103. In this coefficient table, DC coefficient data contain ten-bits of data including a sign ($\pm$) bit of, for example, one bit, and AC coefficient data contain eight-bits of data including a sign ($\pm$) bit of, for example, one bit.

The coefficient data from the cosine transform circuit 103 are supplied to a weighting circuit 104. The operation of the weighting circuit 104 is similar to that of weighting circuit 4 shown in FIG. 2 and previously discussed and, as such, will not be repeated.

Coefficient data from the weighting circuit 104 are supplied to a buffer memory 105, composed of a one field memory, and an absolute value generating circuit 106. The coefficient data are converted into absolute values at the absolute value generating circuit 106 and are outputted to a maximum value detector 107, a maximum value detector 108 and a frequency distribution memory 111. The output signals of the maximum value detectors 107 and 108 are supplied to frequency distribution memories 109 and 110, respectively The maximum value detector 107 detects a maximum value MAX1 of the absolute values of AC coefficients for every sub-block obtained from a block from DCT 3. Hereinafter, this sub-block is referred to as an M-block. The maximum value detector 108 detects a maximum value MAX2 of the absolute values of AC coefficients for every sub-block obtained from an M-block, hereinafter referred to as an S-block.

The above mentioned (8×8) L-block is further divided into 4 (4×4) M-blocks M0, M1, M2 and M3 as shown in FIG. 15A. FM, as shown in FIG. 15B, is defined as a flag for the M-blocks. Each M-block Mi (i=0, 1, 2 or 3) shown in FIG. 15C is further divided into 4 S-blocks Si0, Si1, Si2 and Si3 as shown in FIG. 15D. Fs, as shown in FIG. 15E, is defined as a flag for the S-blocks. Contained in each S-block Sij (ij=00 to 03, 10 to 13, 20 to 23 or 30 to 33) shown in FIG. 15F are four samples Pij0, Pij1, Pij2 and Pij3 as shown in FIG. 15G. A flag Fp is determined which corresponds to each of the samples as shown in FIG. 15H. Each bit contained in flags Fm, Fs, or Fp indicates whether or not there are significant, that is, not zero, AC coefficient data. More specifically, a logic 0 of one bit indicates an absence of significant data, whereas a logic 1 of one bit indicates the existence of significant data.

In the case where the L-block (or the M-block) is divided into M-blocks (or S-blocks), the vertical side and the horizontal side of the M-blocks (or the S-blocks) are equally divided as shown in FIG. 15. A zigzag scanning order can also be utilized for dividing the larger block into smaller blocks.

The frequency distribution memories 109, 110 and 111 are provided for the buffering process which will be hereinafter described. In the frequency distribution memory 109, the frequency distribution of the maximum value MAX1 in an M-block of AC coefficients, which were previously converted into absolute values, is stored and accumulated for a period corresponding to one field and used to form an accumulated frequency distribution table. Likewise, in the frequency distribution memory 110, the frequency distribution of the maximum value MAX2 in an S-block of AC coefficients, which were previously converted into absolute values, is stored and accumulated for a period corresponding to one field and used to form an accumulated frequency distribution table. Moreover, in the frequency distribution memory 111, the frequency distribution of the AC coefficients converted into the absolute values is stored and accumulated for a period corresponding to one field to form an accumulated frequency distribution.

The buffer memory 105 has a memory capacity of one field which is the unit of the buffering process. Coefficient data from the buffer memory 105 are supplied to a weighting circuit 112. In the weighting circuit 112, which is provided for the buffering process, a controlled-weighting coefficient is multiplied by the coefficient data so that the transmission data amount, that is, the transmission bit number, per field does not exceed a predetermined object value. The maximum value of the weighting coefficients is 1, so that as the weighting coefficients decrease, and become for example $\frac{1}{2}$, $\frac{1}{4}$, $\frac{1}{8}$, 1/16, 1/32, 1/64 and so forth, the amount of data to be transmitted decreases. The object is to subject the AC components to the buffering process, whereas the DC components, which are of relatively high importance are transmitted in the original data form.

Addresses for the frequency distribution memories 109, 110 and 111, and a mode signal for designating a weighting coefficient for the weighting circuit 112 are developed at a control signal generating circuit 113. Coefficient data and the mode signal are supplied to a format development circuit 114, in which transmission data are generated and supplied to an output terminal 115 of the format development circuit 114 for transmitting to a transmission path. An example of such a transmission path is a process for magnetic recording/reproduction. In the format development circuit 114, the addition of a synchronization pattern for transmission, processing for error correction encoding and so forth are made when necessary. The processing including, for example, the calculation of the transmission bit number can be done in a data-dropping period of the input data, that is, the vertical blanking period. The weighting process is for data read out of the buffer memory 105 in the next field period.

FIG. 16A shows a structure of transmission data, in which the data of a direct current component DC (10 bits) are positioned first, flags Fm, Fs and Fp are positioned in order after the DC data and the AC coefficient data are positioned after the flag Fp.

The structure of the transmission data will now be described in more detail, in which the significant data are indicated by hatched portions as in, for example, FIG. 16D Among the M-blocks, the significant data are contained within blocks M0 and Mz. Therefore, the bit pattern of the four bit flag Fm is set to (1010) as shown in FIG. 16B.

It is also necessary to send the flag Fs of S-blocks S0j and S2j which correspond to the two M-blocks M0 and M2, respectively. Since S0j and S2j represent a total of eight S-blocks, the flag Fs contains eight bits of data.

Since the significant data are contained in the S-blocks S00, S01, S20 and S23, the flag Fs has the bit patter (11001001) as shown in FIG. 16B. Further, it is also necessary to send the flag Fp for the (4×4=16) samples P00k, P01k, P20k and P23k, which correspond to the four S-blocks in which the significant data are contained. Since the significant data are contained within samples P001, P002, P003, P011, P012, P202 and P230, the bit pattern of the flag Fp is set to (0111011000101000) as shown in FIG. 16B.

The seven samples, from the sixty-four AC coefficient data samples, which contain significant data are identified by flag Fm, Fs and Fp as mentioned above. The significant data are arranged in order of data value after the flag Fp. Samples P001 to P230 are converted into transmission data D001 to D230, respectively. Since the conversion of AC coefficient data is similar to that described in reference to FIG. 7, further detailed description is omitted.

Figure 17:
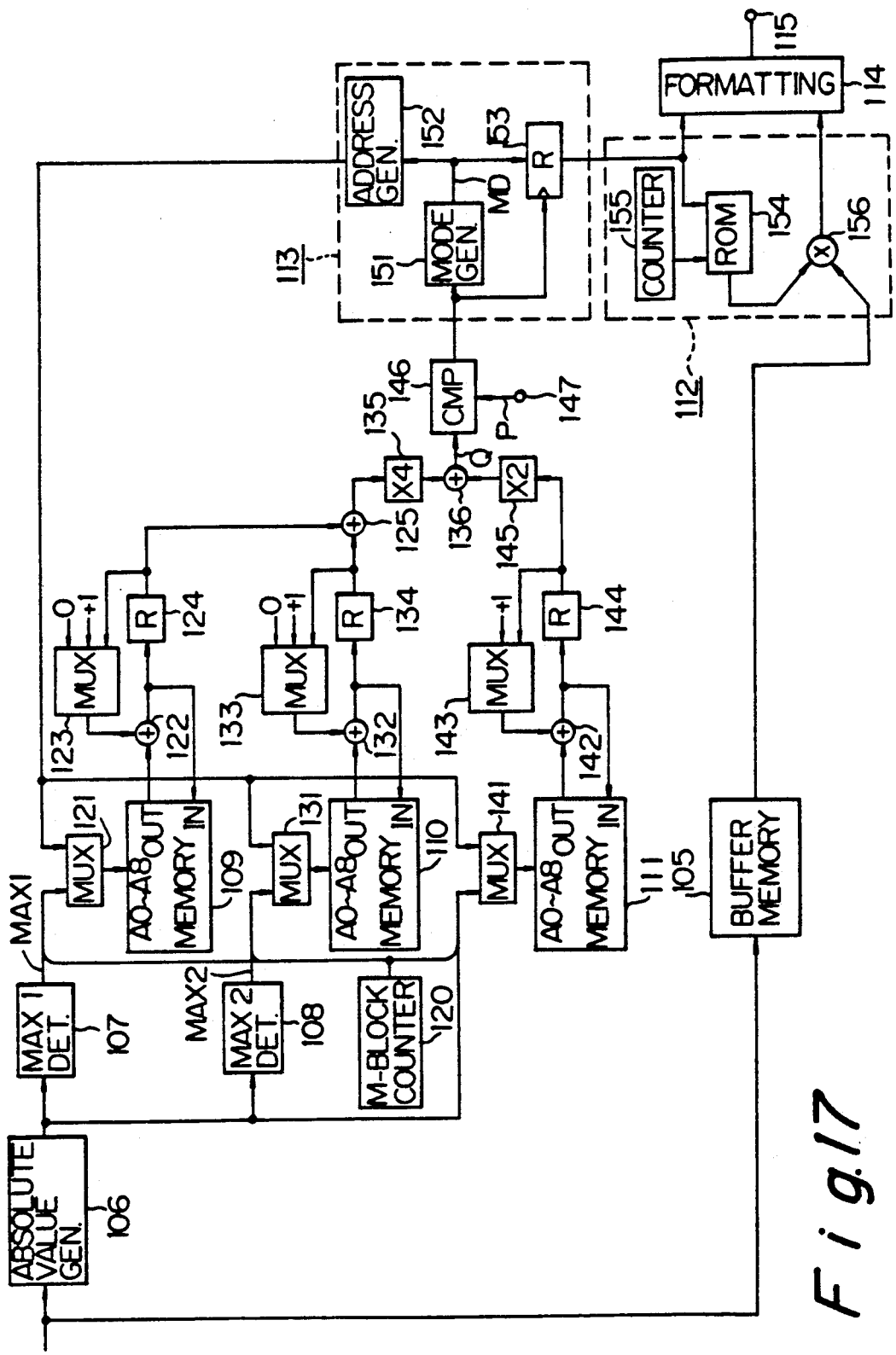
FIG. 17 is a block diagram of a distribution table generator.

FIG. 17 illustrates a distribution table generator with a buffering process in accordance with another embodiment of the present invention. In FIG. 17, an absolute value of an AC coefficient from the absolute value generating circuit 106 is supplied to the maximum value detector 107, in which a maximum value MAX1 for each M-block is detected. The maximum value MAX1 is supplied to a multiplexer 121 which outputs a signal, that is, a seven-bit address A0 to A6 signal, to frequency distribution memory 109. A maximum value MAX2 for each S-block which is detected at the maximum value detector 108 is supplied to a multiplexer 131, which outputs a signal, that is, seven-bit address A0 to A6 signal to frequency distribution memory 110. Further, the absolute value of the AC coefficient is supplied to a multiplexer 141, which supplies an output signal, as a seven-bit address A0 to A6 signal, to frequency distribution memory An M-block counter 120 supplies a two bit signal, as an upper address A7 and A8 signal, to the multiplexers 121, 131 and 141. The memory area of memories 109, 110 and 111 are divided to correspond to the M-block by the upper addresses A7 and A8.

Data readout from frequency distribution memory 109 are supplied to an adder 122 and added to the output of a multiplexer 123. Multiplexer 123 receives as input signals 0, +1 and the output signal of a register 124 and selects one of these input signals as the output signal to be supplied to the adder 122. The output signal of the adder 122 is supplied to register 124. The output signal of the register 124 is fed back to the multiplexer 123, as previously described, and further supplied to an adder 125.

Data read out from frequency distribution memory 110 are supplied to an adder 132 and added to the output of a multiplexer 133. Multiplexer 133 receives as input signals 0, +1 and the output signal of a register 134 and selects one of these input signals as the output signal to be supplied to the adder 132. The output signal of the adder 132 is supplied to a register 134. The output signal of the register 134 is fed back to the multiplexer 133, as previously described, and further supplied to the adder 125. The input signals to adder 125 are added together and an output signal therefrom is multiplied by 4 in a multiplier 135 coupled. The output signal of the multiplier 135 is coupled to an adder 136.

In a manner similar to that previously described, an adder 142, a multiplexer 143, a register 144 and a multiplier (2×circuit) 145 are provided for frequency distribution memory 111. The multipliers 135 and 145 can be composed of a shift circuit.

As hereinafter described, the number of transmission bits Q of AC coefficients is obtained at the output of adder 136, and supplied to a comparator 146. An object value P of the number of transmission bits is coupled to the comparator 146 from a terminal 147. Comparator 146 detects whether the calculated transmission bit number Q is larger or smaller than the object value P. In the case of (P>Q), for example, the comparison output signal becomes a relatively high level signal.

The comparison output signal from comparator 146 is coupled to a mode generator 151 in control signal generating circuit 113, which is indicated in a block formed of broken lines. The mode generator 151 generates a mode control signal MD of, for example, three bits. The mode control signal MD is supplied to an address generator 152 and a register 153. The mode signal generator 151 increases the mode number i from 0 in a step by step fashion, and monitors the comparison output signal at a stage for each mode number i. More specifically, when the relationship between the transmission bit number Q and the object value P is (P>Q), the mode number i is increased to (i+1).

The increasing of the mode number i is stopped when the condition (P>Q) is no longer satisfied.

The comparison output signal from the comparator 146 is further supplied to register 153 as a clock signal. When the condition (P>Q) is no longer satisfied, the mode control signal MD is permitted to be supplied into the register 153. In addition, an address signal developed by the address generator 152 is supplied to the multiplexers 121, 131 and 141.

The various i modes which are controlled by the mode control signal MD are listed below. As is appreciated, the number of transmission bits becomes larger as the mode number i increases:

mode 1: AC coefficient is multiplied by 1/64 and transmitted.
mode 2: AC coefficient is multiplied by 1/32 and transmitted.
mode 3: AC coefficient is multiplied by 1/16 and transmitted.
mode 4: AC coefficient is multiplied by ⅛ and transmitted.
mode 5: AC coefficient is multiplied by ¼ and transmitted.
mode 6: AC coefficient is multiplied by ½ and transmitted.
mode 7: AC coefficient is transmitted as is.

Here mode 0 indicates that the transmission path would overflow with data even if the transmission bits were compressed as much as possible. However, under normal conditions, such overflow does not occur.

The mode control signal MD from the register 153 is supplied to the weighting circuit 112, indicated by a broken line block. The weighting circuit 112 is generally constituted by a ROM 154 and a multiplier 156. The ROM 154 is supplied, as an address, with the mode control signal MD from the register 153 and an M-block number generated at a counter 155, and generates a weighting coefficient. The multiplier 156 multiplies the coefficient data from the buffer memory 105 and the weighting coefficient read out of the ROM 154 together. The output data of the multiplier 156 are supplied to the format development circuit 114 so as to be converted into transmission data together with the mode control signal MD.

The supply of the M-block number from the counter 155 at the weighting circuit 112 enables multiplication of a finer weighting coefficient corresponding to the M-block, rather than a weighting coefficient such as ½ by the AC coefficient.

The process for obtaining the transmission bit number will be explained hereinbelow, in which the number of L-blocks is indicated by NB and with, for example, 2700 blocks/field.

Referring to FIG. 16A, flag Fm and the DC component in the transmission data must be transmitted in all blocks independent of the contents of a picture, so that $(4+10) \times NB = 14NB$ (37800 bits/field for example) are a fixed data amount. As the bit numbers of the flags Fs and Fp, and the AC coefficient data are variable, and since it is necessary to know these bit numbers, a comparison of the data amount Q and the object value P of the variable bit numbers is performed at comparator 146.

A description will now be given on the calculation of the data amount of the flag Fs. In the case where the flag Fs must be sent, there is at least one AC coefficient having a value other than zero in each 16 samples contained in the M-block Mi. Therefore, it is sufficient only to focus on the maximum value MAX1 of the AC coefficients of each M-block. The frequency distribution of the maximum value MAXI of the absolute values of the AC coefficients in the M-blocks Mi of all blocks in one field is developed, and converted into an accumulated frequency distribution.

The frequency distribution memory 109 is cleared prior to writing in the data, so that adder 122 generates zero data at the time of the clear operation. Also, sequentially changing 9 bit addresses from the address generator 152 of the control signal generating circuit 113 are supplied through the multiplexer 121 to the memory 109, so that zero data are written into all addresses, for example 0, 1, 2, ..., 510, 511.

After the clear operation, the multiplexer 121 selects the maximum value MAXI detected at the maximum value detector 107, and the M-block address. The multiplexer 123 selects an input of +1. Data at an address designated by the maximum value MAX1 and the M-block number are read out of the memory 109 and added to +1 at the adder 122. The output data of the adder 122 are written into the same address as the input data of the memory 109. This writing operation is performed at the rate of once per 16 samples. After this processing has been performed for one field period, the frequency distribution of the maximum value MAXl of the absolute values of the AC coefficients is stored in the frequency distribution memory 109 for every M-block.

In a manner similar to that previously described for frequency distribution memory 109, the frequency distribution memory 110 is initially cleared to zero, and the content of the memory 110 is added by +1 at the adder 132 and written into the same address using the maximum value MAX2 of the absolute value of the AC coefficient detected every S-block and M-block address as its address, so that a frequency distribution table corresponding to one field period of the maximum value MAX2 is formed in the memory 110 in respect of every M-block. This writing operation is performed at the rate of once per 4 samples.

Further, as previously described for frequency distribution memory 110, the frequency distribution memory 111 is initially cleared to zero, and the content of the memory 111 is added by +1 at the adder 142 and written into the same address using the M-block address and the absolute value of the AC coefficient as its address so that a frequency distribution table corresponding to one field period of the absolute value of the AC coefficients is formed in the memory 111.

Accumulated frequency distribution tables are developed from the distribution tables of occurrence frequency corresponding to one field formed in the memories 109, 110 and 111. For forming the accumulated frequency distribution tables, the multiplexers 121, 131 and 141 are switched so as to select the output of the address generator 152 of the control signal generating circuit 113, and the multiplexers 123, 133 and 143 are switched so as to select the respective outputs of the registers 124, 134 and 144. The address generator 152 generates the 9-bit addresses A0 to A8 as mentioned hereinafter.

In forming the accumulated frequency distribution table of the block M0, the upper addresses (A7, A8) are set to (00), and the 7-bit lower addresses A0 to A6 are generated decrementally such as (127, 126, 125, ... 2, 1, 0).

In forming the accumulated frequency distribution table of the block M1, the upper addresses (A7, A8) are set to (10), and the 7-bit lower addresses A0 to A6 are generated decrementally such as (127, 126, 125, ... 2, 1, 0).

In forming the accumulated frequency distribution table of the block M2, the upper addresses (A7, A8) are set to (01), and the 7-bit lower addresses A0 to A6 are generated decrementally such as (127, 126, 125, ... 2, 1, 0).

In forming the accumulated frequency distribution table of the block M3, the upper addresses (A7, A8) are set to (11), and the 7-bit lower addresses A0 to A6 are generated decrementally such as (127, 126, 125, ... 2, 1, 0).

The read-out output of each address previously mentioned is added to the outputs of registers 124, 134 and 144 at the adders 122, 132 and 142, respectively. The registers 124, 134 and 144 are reset to zero prior to forming an accumulated frequency distribution table. Therefore, a value from the address 127 is written into the memories 109, 110 and 111 as an accumulated value with respect to each M-block. By processing through the addresses of the memories 109, 110 and 111, as previously described, that is, from the address 127 to the address 1 for every M-block, an accumulated frequency distribution table is developed in each memory.

The form of the accumulated frequency distribution table is similar to that shown in FIG. 11. Since the manner for calculating the transmission bit number of each flag and the significant AC coefficient is very similar to the manner previously described in the abovementioned first embodiment, a further detailed description is omitted Further, after an accumulative frequency distribution table is formed in the frequency distribution memories 109, 110 and 111 multiplexers 121, 131 and 141 are switched so as to select the address from the address generator 152, and the multiplexers 123, 133 and 143 are switched so as to select the output signal from the registers 124, 134 and 144, respectively.

The address generator 152 generates an address according to the flowchart shown in FIG. 18. The register 144 is initially cleared to zero at step 161. Next, the mode number i is set to an initial value of (0) at step 162. Registers 124 and are cleared to zero at step 163. In step 164 a value of $(64/2^i)$, which is equal to 64 when i is 0, is generated for the lower addresses A0 to A6. The value of $(64/2^i)$ defines a minimum transmission value ni. The upper addresses A7 and A8 vary from 0 1 to 1, 1 to 2, and 2 to 3, successively at step 165.

After the upper addresses A7 and A8 are advanced from 0 to 3, the output data of the adder 125 indicates the total number of bits of the flag Fs and Fp per one field as mentioned below, in which j denotes the number of the M-block.

$$\sum_{j=0}^{3} \{S_j(ni) + P_j(ni)\}$$

The output data of the adder 125 are multiplied by 4 at the multiplier 135 and the multiplied output data are supplied to the adder 136.

The output data from register 144 are multiplied by 2 at the multiplier 145. Thus, the total number of bits of AC coefficient data are calculated from the following relationship:

$$\sum_{k=0}^{i} \sum_{j=0}^{3} AC_j(ni)$$

The comparator 146 compares the amount of generated data Q with the object value P at step 166. When the condition of (P>Q) is satisfied, the mode number i is changed to (i+1) at step 167, and processing returns to the step 163. On the other hand, when the condition of (P>Q) is not satisfied, further processing of the mode number i is stopped as shown in step 168. The mode number obtained after the stop is adopted and identified by the mode control signal MD.

As mentioned before, the mode in which the transmission bit number is smaller than the object value is decided, whereupon the AC coefficient delayed by buffer memory 105 is multiplied by the weighting coefficient corresponding to the above mode.

As described above in detail, the present invention enables feed forward control so as to maintain the data amount necessary for transmission smaller than an object value. For this reason oscillation does not occur, as contrasted with the oscillation that occurs in a feedback control apparatus. In addition, the invention allows the correct control of the data amount for one field or one frame so as to be particularly well suited for use with a digital VTR. Further, since the amount of the generated data is calculated for every M-block, the amount of the generated data is finely controlled.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A highly efficient coding apparatus for encoding received digital video data in block format and compressing said digital video data when required so that the total bit rate of said digital video data to be transmitted is less than a predetermined transmission bit rate capacity, comprising:
   block segmentation means receiving said digital video data and for generating data in said block format,
   orthogonal transformation means receiving the block formatted data and for generating coefficient data having a direct current (DC) data component and a plurality of alternating current (AC) data components each having a respective number of bits for each block,
   first generating means for generating a first distribution table from the AC coefficient data components during a predetermined period,
   second generating means for generating an accumulating distribution table from said first distribution table,
   control means for controlling the total bit number of said AC coefficient data components generated during each said predetermined period in response to said accumulating distribution table and said predetermined transmission bit rate capacity, and
   data transmitting means having said predetermined transmission bit rate capacity for transmitting said DC coefficient data component, the controlled AC coefficient data components and an additional code in each said predetermined period.

2. A high efficient coding apparatus as in claim 1, wherein said control means includes calculating means for calculating a calculated total bit number of said AC coefficient data components during each said predetermined period on the basis of said accumulating distribution table, and comparator means for comparing said calculated total bit number with said predetermined transmission bit rate capacity of said data transmission means.

3. A highly efficient coding apparatus for encoding received digital video data in block format and compressing said digital video data for transmission, comprising:
   block segmentation means receiving said digital video data and for generating data in said block format,
   orthogonal transformation means receiving the block formatted data and for generating coefficient data having a direct current (DC) data component and a plurality of alternating current (AC) data components for each block,
   sub-block segmentation means receiving the AC coefficient data components of each block and for dividing the same into a plurality of sub-blocks,
   generating means for generating address information indicating which of said sub-blocks contain significant coefficient data, and
   data transmission means for transmitting said DC coefficient data component, said address information, and said significant coefficient data for each block.

4. A highly efficient coding apparatus for encoding received digital video data in block format and compressing said digital video data for transmission, comprising:
   block segmentation means receiving said digital video data and for generating data in said block format,
   orthogonal transformation means receiving the block formatted data and for generating coefficient data having a direct current (DC) data component and a plurality of alternating current (AC) data components for each block,
   sub-block segmentation means receiving the AC coefficient data components of each block and for sequentially dividing the same into a plurality of sub-blocks which in turn are divided into smaller sub-blocks, generating means for generating transmission pattern data for each size of said sub-blocks indicating which of said sub-blocks contain significant data, and data transmission means for transmitting said DC coefficient data component, said transmission pattern data, and said significant coefficient data for each block.

* * * * *